(12) United States Patent  
Ehrhardt et al.

(10) Patent No.: US 8,616,894 B2  
(45) Date of Patent: Dec. 31, 2013

(54) VIRTUAL OPERATION SIMULATOR

(75) Inventors: André Ehrhardt, Tuttlingen (DE);  
Klaus M. Irion, Liptingen (DE); Björn Speiser, Rottweil (DE)

(73) Assignee: Karl Storz GmbH & Co. KG (DE)

( * ) Notice: Subject to any disclaimer, the term of this patent is extended or adjusted under 35 U.S.C. 154(b) by 1999 days.

(21) Appl. No.: 11/232,359

(22) Filed: Sep. 21, 2005

(65) Prior Publication Data

US 2006/0073458 A1    Apr. 6, 2006

(30) Foreign Application Priority Data

Sep. 21, 2004    (DE) .......................... 10 2004 046 038

(51) Int. Cl.  
*G09B 23/28*    (2006.01)

(52) U.S. Cl.  
USPC .......................................................... 434/262

(58) Field of Classification Search  
USPC .......................................................... 434/262  
See application file for complete search history.

(56) References Cited

U.S. PATENT DOCUMENTS 5,391,081 A * 2/1995 Lampotang et al. .......... 434/262  
5,576,727 A * 11/1996 Rosenberg et al. ........... 345/179

(Continued)

FOREIGN PATENT DOCUMENTS

EP    0970714 A2    1/2000  
WO    9938141 A1    7/1999

OTHER PUBLICATIONS

Källström et al. Use of a Virtual Reality, Real-Time Simulation Model for the Training of Urologists in a Transurethral Resection of the Prostate, Scandanavian Journal of Urology and Nephrology, vol. 39, No. 4, p. 313-20, Sep. 2005.*

(Continued)

*Primary Examiner* — Nikolai A Gishnock  
(74) *Attorney, Agent, or Firm* — St. Onge Steward Johnston & Reens LLC

(57) ABSTRACT

The invention relates to a virtual OP simulator (10) for training for minimal-invasive operations, in particular for endourological interventions, having a simulation calculator unit (12), at least one instrument (40), at least one instrument input unit (30) for picking up the instrument (40), with the instrument input unit (30) allowing and recording movement of the instrument (40) in a predetermined number of degrees of freedom, and a force feedback unit (60) which is associated with the instrument input unit (30) and applies variable forces to the instrument (40) directly or indirectly via the instrument input unit (30). A monitoring control unit (20) is provided, which is connected to the simulation computer unit (12) and to the instrument input unit (30), with the monitoring control unit (20) having a first interface (24) which provides communication of parameters between the monitoring control unit (20) and the simulation computer unit (12) at a speed in the region of the video framing rate, and having a second interface (26) which provides communication of parameters with the instrument input unit (30) at a speed which is higher than, in particular a multiple of, the video framing rate, and with the instrument input unit (30) allowing at least four degrees of freedom, detecting movements of the instrument (40) within these degrees of freedom, supplying corresponding signals to the monitoring control unit (20) and receiving signals for the force feedback unit (60), at least some of which are generated by the simulation computer unit (12).

19 Claims, 2 Drawing Sheets

(56) References Cited

U.S. PATENT DOCUMENTS

| | | | |
|---|---|---|---|
| 5,769,640 A * | 6/1998 | Jacobus et al. | 434/262 |
| 6,024,576 A * | 2/2000 | Bevirt et al. | 434/262 |
| 2001/0016804 A1 | 8/2001 | Cunningham et al. | |
| 2003/0068606 A1* | 4/2003 | Nicholls et al. | 434/262 |
| 2004/0036687 A1* | 2/2004 | Nakamura et al. | 345/422 |
| 2004/0248072 A1* | 12/2004 | Gray et al. | 434/262 |
| 2005/0181342 A1* | 8/2005 | Toly | 434/262 |

OTHER PUBLICATIONS

Ballaro et al. A Computer Generated Interactive Transurethral Prostatic Resection Simulator. Journal of Urology, vol. 162, p. 1633-35, Nov. 1999.*
Kumar, PVS et al. A Computer Assisted Surgical Trainer for Transurethral Resection of the Prostate. Journal of Urology, vol. 168, pp. 2111-2114, Nov. 2002.*
European Search Report, Mar. 6, 2008, 6 pages.

* cited by examiner

VIRTUAL OPERATION SIMULATOR

CROSS REFERENCE TO RELATED APPLICATION

The present application claims priority of German Patent Application No. 10 2004 046 038.8 filed on Sep. 21, 2004.

The present invention relates to a virtual OP simulator for training for minimal-invasive operations, in particular for endourological interventions, having a simulation computer unit, at least one instrument, at least one instrument input unit for picking up the instrument, with the instrument input unit allowing and recording movement of the instrument in a predetermined number of degrees of freedom, and a force feedback unit which is associated with the instrument input unit and applies variable forces to the instrument directly or indirectly via the instrument input unit.

BACKGROUND OF THE INVENTION

Virtual OP simulators of the type mentioned above are generally known. By way of example, the applicant of the present application is marketing simulators such as these. Furthermore, virtual OP simulators for training for minimal-invasive operations are known, for example, from U.S. Pat. No. 5,800,178 or U.S. Pat. No. 5,629,594.

In general, modern computer-aided simulators for carrying out virtual operations require a relatively large amount of computation power which is required, on the one hand for calculation of the virtual operation site, the soft tissue simulation and the virtual instruments, and on the other hand for driving the corresponding motor-based input unit for force reaction and force feedback, and for recording of the instrument position and other input parameters. Both the drive for the input unit for force reaction and the recording of the instrument position and other input parameters should take place in real time, in which case the frequencies for force reaction should also be significantly higher since, otherwise, the user is not provided with a realistic training sensation. In this context, real time means that the transmission frequency of the individual parameters corresponds at least to that frequency at which frames are displayed on a display of the computer-based simulator (referred to in the following text as the video frequency).

A plurality of computer systems have until now generally been used for this purpose, for example on the one hand a high-performance PC for virtual imaging and for simulation of the soft tissue, and on the other hand digital signal processors with suitable software for driving the corresponding motor systems for force reaction.

This computation complexity and the complexity associated with it for the required computers increases when instruments and their force reaction are intended to take place in a plurality of degrees of freedom, and the aim is to simulate not only the movement of the instrument but also the distal force influence of the endoscopic instrument on the tissue and vice versa (action=reaction). The complexity increases further when the aim is to simulate more than one access.

Against this background, the object of the invention is to develop a virtual OP simulator of the type mentioned initially such that the requirements for the computer power of the simulation computer unit can be reduced, with the aim of being able to move the instrument within at least four degrees of freedom.

This object is achieved by the virtual OP simulator mentioned in the introduction in that a monitoring control unit is provided, which is connected to the simulation computer unit and to the instrument input unit, with the monitoring control unit having a first interface which provides communication of parameters between the monitoring control unit and the simulation computer unit at a speed in the region of the video framing rate, and having a second interface which provides communication of parameters with the instrument input unit at a speed which is higher than, in particular a multiple of, the video framing rate, and the instrument input unit allows a total of four degrees of freedom, detects movements of the instrument within these degrees of freedom, supplies corresponding signals to the monitoring control unit and receives signals for the force feedback unit, at least some of which are generated by the simulation computer unit.

For the purposes of the present invention, the expression "parameter" means a data item (which may possibly be composed of a plurality of individual data items as well) for description of a value, for example the position of the instrument.

In other words, this means that the data records associated with one parameter are transmitted at a frequency which corresponds to the video framing rate or to a multiple of it.

The monitoring control unit makes it possible to reduce the load on the simulation computer unit since a smaller amount of data need be transmitted per unit time to the monitoring control unit. This then also results in less computation complexity for production of this data. This data essentially comprises force values which are required for production of the force reaction to the instrument.

However, the data transmission from the monitoring control unit to the instrument input unit and the force feedback unit takes place at a very much higher rate, so that it is possible to provide the user with a realistic force reaction.

In addition to this advantage of the reduced requirements on the simulation computer unit, a further advantage of the virtual OP simulator according to the invention is that the instrument can be moved in at least four degrees of freedom, in which case all of the movements can be recorded by the instrument input unit and a force reaction can be produced for each movement. The four degrees of freedom are two tilting movements (x and y directions; also referred to as pitch and yaw), a translational movement of the instrument into and out of the instrument input unit (z direction; referred to as "trans") and a rotary movement of the instrument about its own longitudinal axis (also referred to as roll).

The virtual OP simulator thus allows considerably more realistic training than the known OP simulators.

In one preferred development, the first interface is a serial interface, in particular a USB interface.

It is thus possible to use the USB interface, which is provided as standard on a PC, for communication with the monitoring control unit. Furthermore, the transmission speed of a serial interface is sufficient to achieve the required relatively low transmission speed.

In consequence, the advantage is that the requirements for the simulation computer unit can be reduced.

In a further development, the second interface is a parallel interface

In comparison to a serial interface, this has the advantage that a considerably higher transmission speed is possible, and the complexity can be kept low by using a standardized interface such as this.

In one preferred development, the instrument is related on the proximal side to a resectoscope with optics, a resection loop and a rinsing shaft, and has an actuating element, in particular a microactuating element, which is associated with the force feedback unit and injects a force into the axial loop movement, which force simulates distal-side tissue resistance to the loop.

In other words, this means that the actuating element can be used to provide the user with realistic resistance when touching and gripping tissue during operation of the resection loop, this being the resistance which would be exerted by the resistance of the tissue that had been touched and/or gripped during a real operation.

The advantage in this case as well is that this allows a further improvement in the "realism" of the OP simulator.

In a further development, valvecocks are provided on the rinsing shaft of the instrument and are provided with sensors for recording of the valvecock movement, with the signals which are produced by the sensors being transmitted via the monitoring control unit to the simulation computer unit.

In other words, this means that the virtual OP simulator according to the invention also allows simulation of the operation of the valvecocks and of the functions associated with them. By way of example, the operation of a valvecock may cause the simulation computer unit to simulate rinsing and to display this appropriately on a monitor. Particularly during endourological interventions, spontaneous bleeding occurs very frequently and has an extremely deleterious effect on the endoscopic view. The view can be reproduced only by active rinsing.

The advantage in this case as well is that the virtual OP simulator allows even more realistic training.

In one preferred development, the electrical lines for transmission of electrical signals to and from the instrument are passed via the normally provided light connection. From there, they are carried in a manner corresponding to an optical waveguide in a flexible tube to the monitoring control unit.

In other words, this means that the electrical lines are passed into the interior via the light connection that is provided on an instrument, so that the instrument does not require any additional openings, etc.

The advantage of this measure is that the user is provided with the impression of a real instrument with an optical waveguide, since the cable routing, the weight, the lever ratios etc., correspond to the original instrument. Supplying the lines to different points would lead to the handling of the "training" instrument differing from that of the original instrument.

In one preferred development, the optics of the instrument have an associated endoscopic camera dummy, which is designed on the suspension principle.

In other words, this means that an apparatus is provided on the optics of the instrument which is related to an endoscopic camera, but without having to have any optical elements. In this context, "suspension principle" means that the camera body always points downward as a result of the force of gravity, even when the axis of the instrument is rotated (rolled). This means that the endoscopic horizon remains the same. By way of example, the applicant is marketing such original suspension cameras under the product number 22210032-3 or 22210132-3.

The advantage of this measure is that it results in a further improvement in the realism of the OP simulator.

In a further development, the camera dummy produces control signals which are supplied to the monitoring control unit and relate to specific functions of a camera, in particular focus and zoom.

This measure has the advantage that functions can additionally be simulated via the simulation computer unit which are provided by the endoscopic camera during a normal operation (these include, in particular, focusing of the image and enlarging or reducing the size of the image).

This measure also advantageously makes it possible to improve the realism of the OP simulator according to the invention further.

In one preferred development, the first interface operates at a transmission rate of the individual parameters of 16 to 60 Hz.

In other words, this means that the interface can receive and transmit 16 to 60 data records or values per second for each parameter. However, a value of 50 Hz, that is to say 50 data records or values per second and parameter, is preferable, corresponding to the normal video framing rate. If, for example, it is intended to transmit two parameters, the interface has to transmit a total of 100 data records per second (in each case 50 for each parameter).

By way of example, four discrete signals for adjustment of the force feedback for the four degrees of freedom, a data record for indicating the rotation direction of the force feedback and a data record relating to the state of the overall system are transmitted as parameters from the simulation computer unit to the monitoring control unit.

By way of example, the following data is transmitted as parameters from the monitoring control unit to the simulation computer unit: four data records with the position data (for the four degrees of freedom), eight data records from the instrument and camera, and one data record with state variables, for example the state of three switches in the camera dummy, the state of two foot-operated switches, the state of a trocar module in the instrument input unit (instrument in the trocar).

The abovementioned details relating to the parameters to be transmitted are purely by way of example and may, of course, be changed and matched to particular conditions.

The advantage of the low transmission rate according to the invention is that the simulation computer unit has to provide a relatively small amount of computation power for data transmission so that, in comparison to previous systems, more computation power is available for the actual simulation, that is to say the display on a monitor and the calculation of force reaction values. Overall, this allows conventional standard computers (PCs) to be used which normally operate with the "Windows" operating system, which is actually not suitable for real-time applications.

In one preferred development, the second interface of the monitoring control unit operates at a transmission rate of about 1000 Hz.

In other words, this means that the interface can transmit 1000 values per second to the instrument input unit and/or to the force feedback unit. The advantage is that the user can be provided with a more realistic tactile impression.

In one preferred development, the monitoring control unit is designed to receive a number of force values per second for the force feedback unit from the simulation computer unit, to calculate a multiple of this number of force values by interpolation, and to send them to the instrument input unit for the force feedback unit.

In other words, this means that the monitoring control unit uses the values supplied from the simulation computer unit to calculate a large number of intermediate values, which it transmits to the instrument input unit. These interpolated intermediate values allow the tactile feeling during operation of the instrument to be improved further.

In one preferred development, the force feedback unit has a plurality of actuating elements which are associated with the instrument input unit and interact with the instrument.

In other words, this means that a plurality of actuating elements are provided in order to be able to produce a reaction force for each possible degree of freedom of the movement of the instrument. The corresponding actuating elements are provided either in the instrument input unit which holds the instrument, or in the instrument itself.

Since a force reaction is provided for each degree of freedom, the OP simulator can be operated very realistically and allows very realistic training.

In one preferred development, the simulation computer unit sends approximately 30 nominal force values per second to the monitoring control unit, and the monitoring control unit uses these approximately 30 values to calculate a multiple (500-1000) of values, and sends them to the instrument input unit.

In practice, this setting choice has been found to be particularly advantageous in order on the one hand to keep the computation load on the simulation computer unit low and on the other hand to allow the control of the instrument to be as realistic as possible.

In one preferred development, a single instrument is provided, and the instrument input unit has a single holder for one instrument.

This measure has also been found to be particularly advantageous in practice. However, it should be mentioned that the OP simulator according to the invention can also be used with a plurality of instruments with one instrument input unit which has a plurality of holders, or with a plurality of instrument input units.

Further advantages and refinements of the invention are specified in the other dependent claims or in the description and the attached drawing.

It is self-evident that the features mentioned above and those which are still to be explained in the following text can be used not only in the respectively stated combination but also in other combinations or on their own without department from the scope of the present invention.

BRIEF DESCRIPTION OF THE DRAWINGS

The invention will now be described in more detail using one exemplary embodiment and with reference to the accompanying drawing, in which.

DESCRIPTION OF A PREFERRED EMBODIMENT

The present invention will be explained in the following text with reference to a virtual OP simulator for training for minimal-invasive operations for endourological interventions. However, it is self-evident that the OP simulator according to the invention can be used not only for endourological interventions but also for the simulation of other endoscopic interventions on human or animal bodies. Furthermore, a resectoscope is described as the instrument in the following text, with this being used purely by way of example. It is self-evident that other instruments can also be used.

Figure 1:
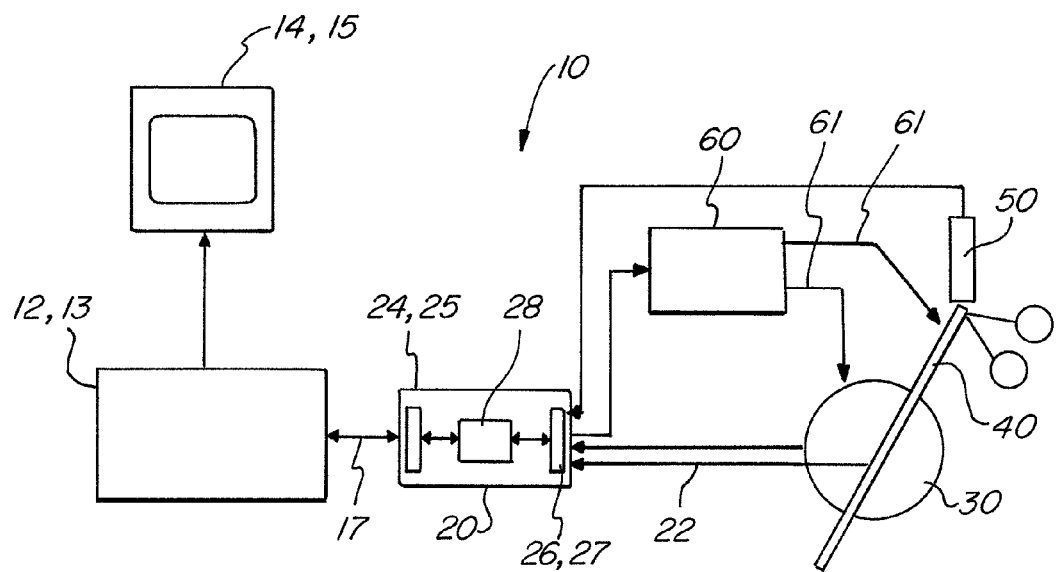
FIG. 1 shows a schematic block diagram of a virtual OP simulator according to the invention.

FIG. 1 shows a virtual OP simulator for training for minimal-invasive operations for endourological interventions in the form of a block diagram, which is identified by the reference symbol 10. The OP simulator 10 has a simulation computer unit 12 which is connected to one or more monitors 14. The simulation computer unit 12 is normally a standard PC 13, and the monitors 14 are TFT flat screens 15.

The simulation computer unit 12 includes the software which is required for operation of the OP simulator 10 and normally runs on the "Windows" operating system. The software itself comprises a plurality of modules, which carry out different functions. By way of example, one module is thus responsible for calculation of the simulation images and for supplying corresponding signals to the monitor or monitors 14. Another module is responsible for calculation of the force feedback values. Finally but not exclusively, however, a module is provided which contains data for realistic models of specific organs. In addition, by way of example, this module contains the morphology, the position, the size and the number of tumors, which can be selected on a random principle. The module is thus used to simulate a "virtual patient". It is self-evident that the software has other modules, for example for data recording and data transmission. However, these will not be described in any more detail here.

The simulation computer unit 12 is connected via a serial data line 17 to a monitoring control unit 20 whose function will be described in detail later.

The OP simulator 10 also has an instrument input unit 30, which is used for holding an instrument 40. The instrument input unit 30, which is also referred to as an active trocar module (ATM), is likewise connected to the monitoring control unit 20 via data lines 22. The instrument input unit 30 is itself used to hold the instrument 40 and to allow its movement in a large number of directions (degrees of freedom). For illustrative purposes, FIG. 1 shows direction arrows x, y, z and r for the four degrees of freedom in the present case. The instrument 40 thus allows tilting in the x and y directions, movement in the z direction (into the trocar module or out of it) and rotation about its own axis (r direction) within the instrument input unit. The design of an instrument input unit 30 such as this is generally described, by way of example, in detail in DE 10 055 294 C2 or 10 055 292 A1. For simplicity, reference is therefore made to the abovementioned documents, whose disclosure content is hereby also included by reference in the present application.

In brief, the instrument input unit has a mechanical unit which allows the instrument to be moved in four degrees of freedom, a plurality of actuating elements in the form of motors for force feedback and sensors for recording of the movement of the instrument and its precise position. A plurality of incremental rotation angle encoders are normally used as sensors. Four rotation angle encoders are preferably used for rotation in the x direction (pitch), rotation in the y direction (yaw), rotation in the r direction (roll) and translation in the z direction (trans). In the present exemplary embodiment, "roll" and "trans" do not come directly from the instrument input unit but are calculated as a function of two rotation angle encoders (DWG2 and DWG3) as DWG3+DWG4=roll, and DWG3−DWG4=trans.

The corresponding signals which are recorded by the sensors are then transmitted as a pulse sequence to the monitoring control unit.

The OP simulator illustrated in FIG. 1 also has a camera 50 which is associated with the instrument 40 and is used as a camera dummy without any real optical function. However, at this point, it should be noted that the use of a camera 50 such as this in the OP simulator 10 may be optional and is not an essential component of the simulator. The camera dummy 50 is modeled on a suspended camera (camera based on the suspension principle), as is available from the applicant, for example, using the product numbers 22210032-3 or 22210132-3. For simplicity, reference is made to the corresponding printed documents relating to these cameras for a more detailed explanation of the method of operation of such a suspended camera.

Finally, the OP simulator 10 has a force feedback unit 60 which has a large number of motor-based actuating elements, which are not shown in FIG. 1. These actuating elements are provided either in the instrument input unit 30 or in the instrument 40 itself. The arrows 61 that are shown are intended to indicate this; in contrast to the other arrows, the arrows 61 are not data lines but, in fact, are association arrows.

It is particularly advantageous to provide an actuating element such as this for each possible degree of freedom of the instrument 40 in order to produce a force opposing the movement of the user independently of the direction, in order in this way to allow a more realistic simulation. The fundamental design of an apparatus such as this, which is also referred to as Force Feedback is generally known, and will not be described in any more detail at this point.

The force feedback unit 60 and the individual actuating elements receive actuating signals from the monitoring control unit 20.

The monitoring control unit 20 in turn receives movement signals from the instrument input unit 30 in the form of a pulse sequence which has been produced by the sensors of the instrument input unit. The monitoring control unit uses this pulse sequence as the basis to calculate the position, orientation and speed of the tip of the instrument 40, and then carries out a coordinate transformation process for pitch, yaw and trans (z). This position data (spherical coordinates and roll) is required by the simulation computer unit 12 in order to calculate appropriate images for display on the monitor 14.

The monitoring control unit 20 is provided with a first interface 24 and a second interface 26 in order to interchange data. The first interface 24 provides communication with the simulation computer unit 12, while the second interface 26 is responsible for communication with the instrument input unit 30 and the force feedback unit 60.

Owing to the large amount of computation power required for the actual simulation, that is to say the calculation and display of the images on the monitor, the data transfer between the simulation computer unit 12 and the monitoring control unit 20 is kept as low as possible. In the present exemplary embodiment, a data transmission rate is chosen which corresponds to the video framing rate. In other words, this means that, if the video framing rate is assumed to be 50 Hz, approximately 50 values per second and parameters to be transmitted are transmitted to the monitoring control unit 20. These values are essentially the "force value" parameters which are determined for the actuating elements for the force feedback unit 60.

Furthermore and inter alia, approximately 50 position data items ("position" parameters) are transmitted per second from the monitoring control unit 20 to the simulation computer unit 12 in order to allow the images to be displayed realistically.

It has been found that the USB interface of a conventional PC 13 as the simulation computer unit 12 is suitable for complying with the abovementioned requirements relating to the transmission rate. The first interface 24 is thus also a USB interface 25.

Since the transmission of 30 to 50 force values for the actuating elements, particularly if there are four or more degrees of freedom, is too little for realistic training, the second interface 26 supplies the data at a very much higher speed. By way of example, 1000 values per second has been found to be particularly advantageous although, of course, other values are also feasible. The values are in this case transmitted in parallel form, so that such higher transmission rates are possible without any difficulties. The second interface 26 is thus a parallel interface 27.

In order to control the interfaces 24, 26, the monitoring control unit 20 has a control element 28 which, for example, may be in the form of a microprocessor. As already mentioned, the number of data items sent to the interface 24 is considerably less than the number of data items sent from the interface 26. The control element 28 is therefore intended to calculate a large number of intermediate values for the data items supplied from the interface 24, by linear extrapolation as a function of the instantaneous force trend (gradient), and to supply these to the second interface 26 for transmission. This calculation is carried out on an FPGA, which is part of the control element 28.

A further object of the control element 28 is to pass on the position data transmitted from the second interface 26 to the first interface 24 for further transmission to the simulation computer unit 12, in which case, however, the data is not processed or amended. It is, of course, also feasible to process this data if required.

At this point, it should once again be noted that the number of data items transmitted from the simulation computer unit 12 to the monitoring control unit 20 is very much less than the number of data items which are required to control the actuating elements for the force feedback unit 60. It is thus possible, according to the invention, to reduce the load on the simulation computer unit 12, since the complexity for calculation of the force feedback values is reduced. The computation power that becomes free in consequence can thus be used for simulation purposes, that is to say for image production and display.

Figure 2:
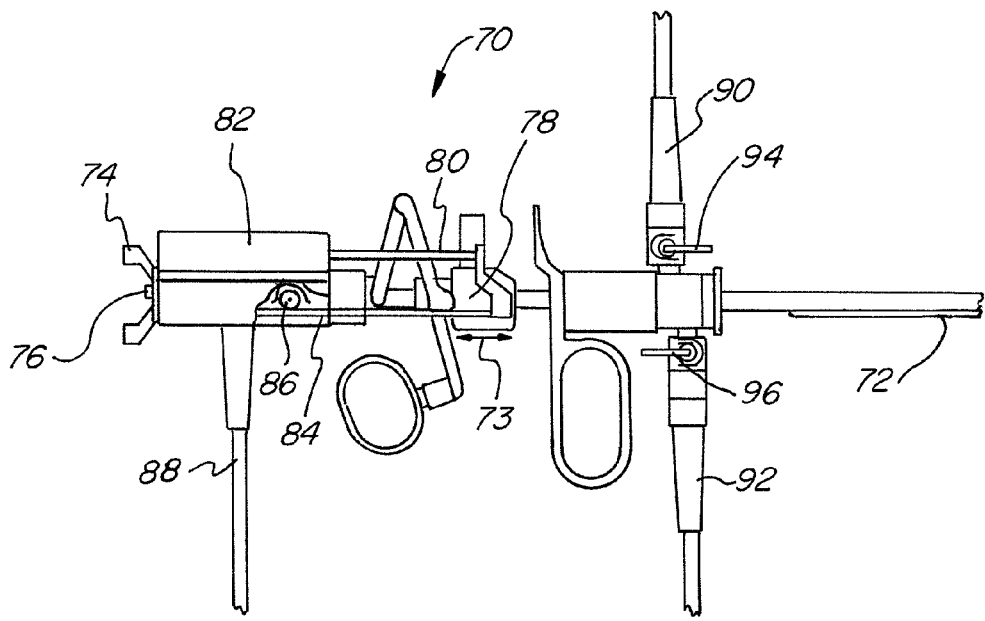
FIG. 2 shows a schematic illustration of an instrument.

In order to design the simulation to be as realistic as possible in particular for operations such as bladder resectioning, the instrument 40 is modeled as the proximal part of a resectoscope. FIG. 2 includes a corresponding illustration of a resectoscope such as this. However, it is self-evident that the OP simulator 10 can also be used with other instruments. The illustration and following description of a resectoscope are by way of example and have been chosen such that they are not restrictive. Other instruments can also be used with the OP simulator 10.

The proximal part of a resectoscope is illustrated schematically in FIG. 2, and is identified by the reference symbol 70. The resectoscope 70 has a toothed rod 72, which can be inserted in a trocar of the instrument input unit 30. In this case, gearwheel on the instrument input unit 30 engages in the toothed rod 72, and thus allows recording of the translational movement within the trocar.

An eyepiece 74 is provided at the proximal end of the resectoscope 70, to which a camera housing can be fitted as will be described in the following text. A probe incline 76 is provided within the eyepiece 74 and allows the position, that is to say the relative position of the camera with respect to the resectoscope, to be recorded.

The resectoscope 70 also has a slide 78 which can be moved in the direction of the arrow 79 by appropriate manipulation by the user. In the case of a normal resectoscope, by way of example, a movement such as this would lead to operation of the resection loop.

The movement of the slide 78 is transferred to a shaft 80 which is a component of a linear potentiometer 82. The movement of the shaft 80 relative to the linear potentiometer 82 leads to a change in the resistance, which can be used to record the position of the slide 78.

The slide 78 is also connected to a toothed rod 84 which transfers the movement of the slide to a gearwheel 86.

This gearwheel 86 is connected to an actuating element, that is to say to a motor, which is part of the force feedback unit 60. A force which opposes the movement of the slide 78 can be applied to the toothed rod 84 via the gearwheel 86 by means of this actuating element. This force can be sensed by the user and is used, for example, to simulate tissue resistance which opposes a resection loop.

The electrical lines which are required for supplying the actuating element and the linear potentiometer are passed—not shown in FIG. 2—via an optical connection 88, which exists in every resectoscope and normally holds optical waveguides.

The resectoscope shown in FIG. 2 also has a supply line 90 and a return line 92 which are respectively used for supplying and returning rinsing liquid. Valvecocks 94 and 96, respectively, are provided in each of these two lines 90, 92 and can open and close the lines in a normal resectoscope. In the present resectoscope 70 for the OP simulator 10, the two valvecocks 94, 96 have associated micropotentiometers which allow any movement of the valvecocks 94, 96 to be recorded. The corresponding electrical signals which are produced by these micropotentiometers are supplied via the monitoring control unit 20 to the simulation computer unit 12 for further evaluation.

Figure 3:
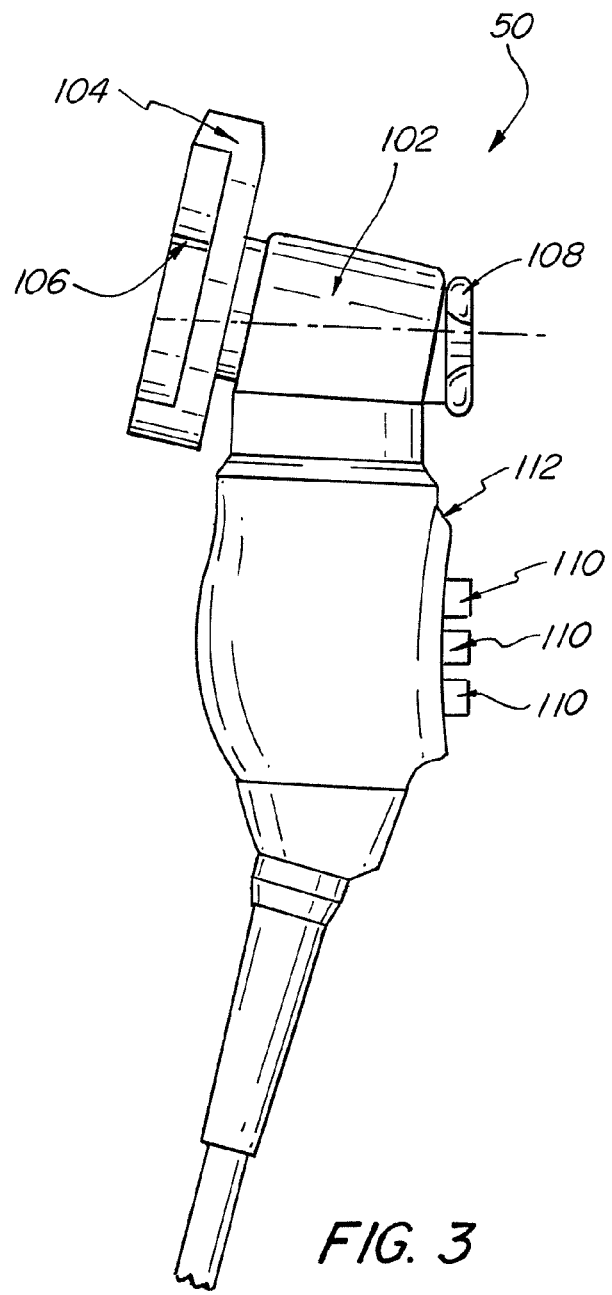
FIG. 3 shows a schematic illustration of a camera.

As already mentioned, a so-called camera dummy can be connected to the eyepiece 74. A camera dummy such as this is illustrated schematically in FIG. 3, and is identified by the reference symbol 50. The camera dummy 50 has a camera head 102 to which an eyepiece holder 104 is fitted such that it can rotate. The camera dummy 100 can be connected to the eyepiece 74 of the resectoscope 70 via this eyepiece holder 104. A probe pin 106 is provided within the eyepiece holder, and interacts with the probe incline 76. This probe pin makes it possible to detect the relative position of the camera with respect to the resectoscope.

The camera dummy 50 also has a rotating focus knob 108 as well as a total of three pushbuttons 110. While the rotating focus knob 108 is provided in the area of the camera head 102, the three pushbuttons 110 are provided in the area of the camera housing 112, and the camera housing 112 can rotate.

The rotating focus knob 108 and the pushbuttons 110 can be used to produce signals which are transmitted via the monitoring control unit 20 to the simulation computer unit 12. These signals can be used to change the image, for example for focusing or for increasing or reducing the size (zooming). Overall, the camera dummy 50 is used to realistically simulate functions available with a camera.

As already mentioned, the illustrated camera dummy is a suspended camera. This camera type is designed such that the camera housing always points downwards by virtue of the force of gravity, even when the instrument 40 is rotated about its axis (r direction). This leads to the endoscopic horizon remaining the same. The probe pin 106 and the probe incline 76 are provided in order to record the relative position of the camera eyepiece. During rotation, a corresponding position data item is produced, and is transmitted to the simulation computer via the monitoring control unit. In the simulation computer, the corresponding software module evaluates the data item and, if required, changes the display on the monitor in response to this.

During operation of the resectoscope illustrated in FIG. 2, a large number of parameters are recorded and are transmitted between the individual units 12, 20 and 30. These parameters include, for example: four discrete signals for variation of the force feedback of the individual actuating elements for the four degrees of freedom, a data record for indication of the rotation direction of the actuating elements for the force feedback, and a data record relating to the status of the overall system. These parameters are transmitted from the simulation computer unit 12 to the monitoring control unit 20.

The following data, by way of example, is transmitted as parameters from the monitor control unit 20 to the simulation computer unit 12: four data records with the position data (for the four degrees of freedom), eight data records from the potentiometers and recording elements of the instrument, camera and valvecocks, and a data record with state variables, such as the status of the three switches 110 in the camera dummy, the status of two foot-operated switches (not shown in the figures), the status of a trocar module for the instrument input unit (that is to say information as to whether an instrument has been inserted in the trocar module).

Further parameters are, of course, feasible. One such further parameter could, for example, be details about the nature of the instrument inserted in the trocar module. However, the instrument input unit 30 must be equipped with an instrument recognition facility for this purpose. The OP simulator 10 shown in FIG. 1 can have an instrument recognition facility such as this added to it at any time. However, this option is not shown in the figures, for simplicity reasons.

The individual parameters can be transmitted via the first interface (USB interface) 24 in various ways. However, the following procedure has been found to be particularly advantageous in practice:

The simulation computer unit 12 reads from and writes to the registers associated with the USB interface approximately 20 times per second. The registers are read from and written to individually and successively, with the following registers being read from in the stated sequence:

a. Four 16-bit data records relating to position data, specifically 0: pitch; 1: yaw; 2-3: roll; 2+3: trans b. eight 16-bit data records relating to analog inputs, specifically 0, 1: Camera angle; 2: Zoom; 3: Focus; 7: LoopDepth; 8: WaterFlush;

c. one 8-bit data record relating to digital inputs (digital input bits), specifically 1: isTrocarPlugged; 2: isBlueButton; 3: isWhiteButton; 4: isCuttingHigh; 5: isCuttingLow.

Next, the simulation computer unit writes to the following registers in the stated sequence:

a. Four 8-bit data records relating to force feedback values for the actuating elements (PWM);

b. One 4-bit data record relating to the direction of the force feedback of the individual actuating elements;

c. One 4-bit data record relating to "Power Enable".

A single instrument input unit 30 is provided in the exemplary embodiment shown in FIG. 1. However, as an alternative to this, it would also be feasible to provide at least one further instrument input unit, of identical design. This would make it possible to provide a multiport system, allowing the simulation of an operation with, for example, two instruments.

In this context, it is also preferable for the two instrument input units to be held such that they can be moved with respect to one another, so that the distance between them would be variable. In a corresponding manner, sensors are provided which record this distance and transmit it to the monitoring control unit and the simulation computer unit, so that the simulation can react appropriately to this.

When using two instrument input units, it is also possible for a real instrument collision to occur, when the two instruments collide with one another. If the user does not react to this collision, the instruments may also be deformed if appropriate forces are applied.

What is claimed is:

1. A virtual operation simulator for training for minimal-invasive operations, in particular for endourological interventions, having
    a simulation computer unit,
    at least one instrument,
    at least one instrument input unit for picking up the instrument, with the instrument input unit allowing and recording movement of the instrument in a predetermined number of degrees of freedom, and
    a force feedback unit which is associated with the instrument input unit and applies variable forces to the instrument directly or indirectly via the instrument input unit,
wherein
    a monitoring control unit is provided, which is connected to the simulation computer unit and to the instrument input unit, with the monitoring control unit having a first interface which provides communication of parameters between the monitoring control unit and the simulation computer unit at a speed of about a video framing rate of the simulator, and having a second interface which provides communication of parameters with the instrument input unit at a speed which is higher than the video framing rate of the simulator, and
    the instrument input unit allows at least four degrees of freedom, detects movements of the instrument within these degrees of freedom, supplies corresponding signals to the monitoring control unit and receives signals for the force feedback unit, at least some of which are generated by the simulation computer unit;
    wherein the monitoring control unit calculates a multiple of the number of data received from the simulation computer unit by linear extrapolation as a function of the instantaneous force trend of the data and sends the multiple of the number of data to the instrument input unit; and
    wherein the monitoring control unit passes position data received from the instrument input unit to the simulation computer unit.

2. The virtual operation simulator as claimed in claim 1, wherein the first interface is a serial interface, in particular a USB interface.

3. The virtual operation simulator as claimed in claim 1, wherein the second interface is a parallel interface.

4. The virtual operation simulator as claimed in claim 1, wherein the instrument is related on the proximal side to a resectoscope with optics, a resection loop and a rinsing shaft, and has an actuating element, in particular a microactuating element, which is associated with the force feedback unit and injects a force into the axial loop movement, which force simulates distal side tissue resistance to the loop.

5. The virtual operation simulator as claimed in claim 4, wherein valvecocks are provided on the rinsing shaft and are provided with sensors for recording of the valvecock movement, with the signals which are produced by the sensors being transmitted via the monitoring control unit to the simulation computer unit.

6. The virtual operation simulator as claimed in claim 1, wherein electrical lines for transmission of electrical signals to and from the instrument are disposed in a portion of the instrument that normally holds optical waveguides associated with a real instrument.

7. The virtual operation simulator as claimed in claim 4, wherein the eyepiece of the instrument has an associated endoscopic camera dummy which is designed on the suspension principle.

8. The virtual operation simulator as claimed in claim 7, wherein the camera dummy produces control signals which are supplied to the monitoring control unit and relate to specific functions of a camera, in particular focus and zoom.

9. The virtual operation simulator as claimed in claim 1, wherein the first interface operates at a transmission speed of 16 to 60 Hz.

10. The virtual operation simulator as claimed in claim 1, wherein the second interface operates at a transmission speed of about 500 to 1000 Hz.

11. The virtual operation simulator as claimed in claim 1, wherein the monitoring control unit is designed to receive a number of force values per second for the force feedback unit from the simulation computer unit, to calculate a multiple of this number of force values by interpolation, and to send them to the instrument input unit for the force feedback unit.

12. The virtual operation simulator as claimed in claim 1, wherein the force feedback unit has a plurality of actuating elements which are associated with the instrument input unit and interact with the instrument.

13. The virtual operation simulator as claimed in claim 1, wherein the simulation computer unit is a personal computer.

14. The virtual operation simulator as claimed in claim 13, wherein the simulation computer unit sends approximately 30 nominal force values per second to the monitoring control unit, and the monitoring control unit uses these approximately 30 values per second to calculate 1000 values per second, and sends them to the instrument input unit.

15. The virtual operation simulator as claimed in claim 1, wherein a single instrument is provided, and the instrument input unit has a single holder for one instrument.

16. The virtual operation simulator as claimed in claim 1, wherein at least two instrument input units are provided, which are arranged at a distance from one another and can each hold one instrument.

17. The virtual operation simulator as claimed in claim 16, wherein a distance recording unit is provided, which is associated with the instrument input units and records the distance between them, and transmits this to the simulation computer unit for further processing.

18. The virtual operation simulator as claimed in claim 16, wherein a holding apparatus is provided for the instrument input units and is designed to allow movement of at least one instrument input unit relative to the other.

19. The virtual operation simulator as claimed in claim 1, wherein the instrument input unit has an instrument recognition apparatus.

* * * * *